July 13, 1937.   R. H. WHITELEY   2,086,787
SELF LUBRICATING BEARING
Filed Dec. 31, 1934
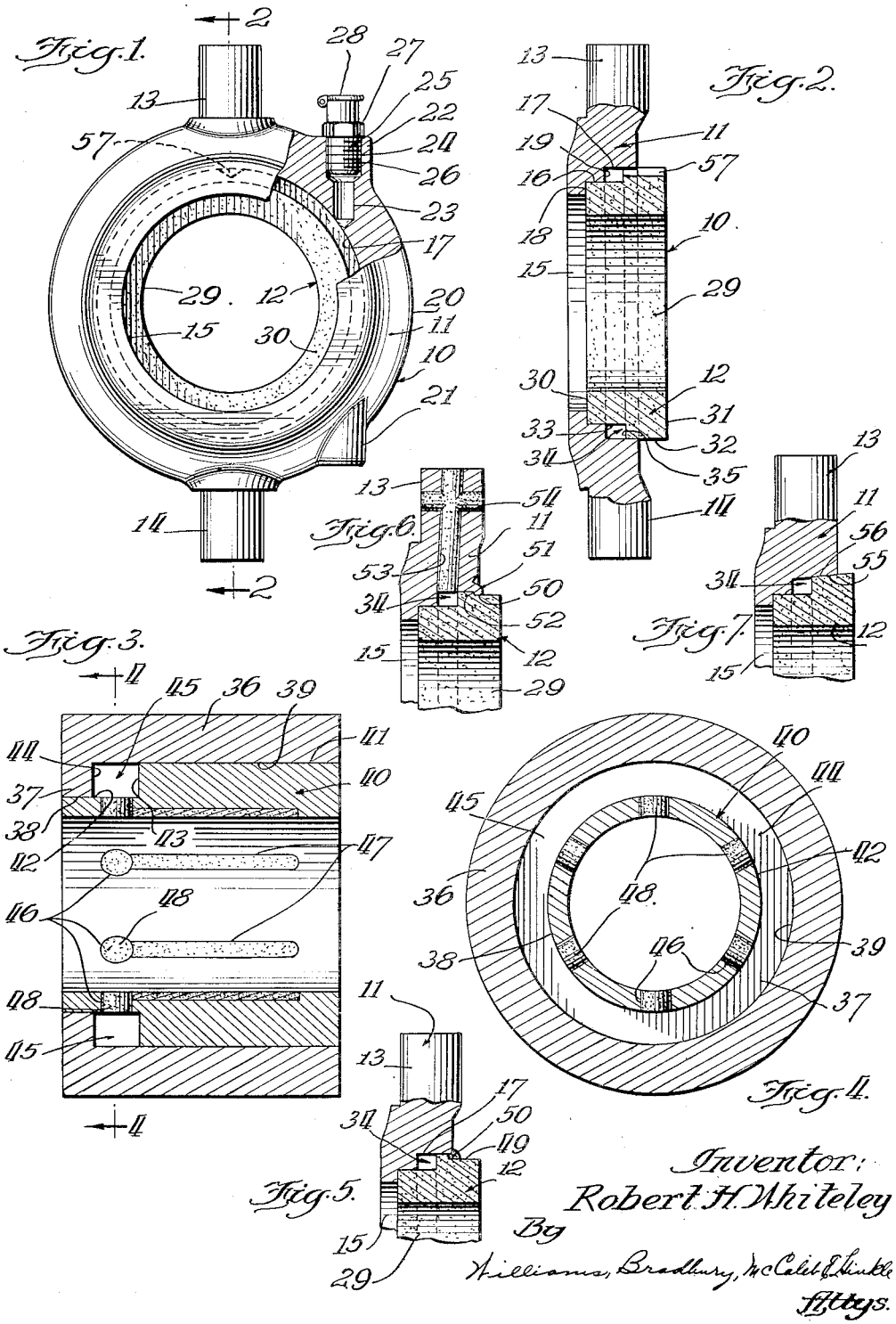

Patented July 13, 1937

2,086,787

UNITED STATES PATENT OFFICE 2,086,787

SELF-LUBRICATING BEARING

Robert H. Whiteley, Oak Park, Ill., assignor to Robert H. Whiteley, trustee

Application December 31, 1934, Serial No. 759,843

1 Claim. (Cl. 308—171)

The present invention relates to self-lubricating bearings, and is particularly concerned with bearings of the type adapted to utilize the porous carbon lubricating members for conducting lubricant from a reservoir to a bearing surface.

One of the preferred forms of the bearing is a clutch throw-out collar of a type adapted to be utilized in modern automotive vehicles, and according to the prior art collars of this type have been provided with a reservoir by grooving the collar and by first heating and then shrinking a metallic collar upon a porous carbon lubricating member.

One of the objects of the present invention is the provision of an improved structure by means of which the operations of grooving and heating may be eliminated and an improved method of assembly of the parts of such a bearing by means of which the parts may be more firmly secured together and assembled at a lesser cost.

Another object of the invention is the provision of an improved structure in which the porous carbon collar is more firmly secured than is possible with the methods and structures of the prior art.

Another object is the provision of a plurality of improved modifications of bearings of this type, all having features common to the same invention, but including various detailed improvements, each of which is advantageous in connection with special applications of the bearing.

Other objects and advantages will be apparent from the following description and the accompanying drawing, in which similar characters of reference indicate similar parts throughout the several views.

Referring to the single sheet of drawings accompanying this specification,

Fig. 1 is a side elevational view of a clutch throw-out bearing constructed according to the present invention;

Fig. 2 is a transverse sectional view of such a bearing, taken on the plane of the line 2—2 of Fig. 1, looking in the direction of the arrows;

Fig. 3 is a sectional view taken on a plane passing through the axis of a journal bearing, showing a modification;

Fig. 4 is a sectional view, taken at right angles to the section of Fig. 3 and on the plane of the line 4—4 of Fig. 3;

Fig. 5 is a fragmentary modification showing another mode of securing the porous carbon collar in a clutch throw-out bearing body;

Fig. 6 is a similar fragmentary view of another modification;

Fig. 7 is a similar fragmentary view of another modification.

Referring to Figs. 1 and 2, 10 indicates in its entirety the clutch throw-out bearing, which consists primarily of a metallic body 11 and a porous carbon lubricant conducting collar 12. The metallic body 11 may be formed of any suitable metal, such as cast iron or steel, and is ordinarily provided with a pair of radially and outwardly projecting trunnions 13, 14 diametrically opposite to each other. The body 11 is annular in form and provided with an enlarged aperture 15 for passing a drive shaft, and in order to form a reservoir without necessity for any grooving operations the body 11 may be provided with a plurality of counterbores 16, 17, the axes of the counterbores 16, 17 being in alignment with the circular aperture 15.

The body 11 is also provided with the annular surfaces 18, 19 at the ends of the counterbores 16 and 17 respectively. If desired, the outer surface 20 of the metal body 11 may be made circular or it may be provided with one or more outwardly projecting lugs 21, 22 for the formation of additional conduits or filling apertures. For example, lug 22 may be provided with a bore 23 and a threaded counterbore 24 for receiving the conventional fitting 25 which is provided with a lower threaded portion 26, the non-circular portion 27, and a spring pressed cap 28.

It should be understood, however, that in some embodiments of the invention the filling apertures and fittings may be dispensed with entirely. This is possible because I propose to fill the reservoir with lubricant according to a method which does not involve the use of a filling aperture, and the only possible reason for providing an oil vent or filling aperture would be for the purpose of a refill.

Bearings of this type employing semi-solid or solid lubricant have been under test and demonstrated the capability of utilization of a relatively small measured amount of lubricant over such a long period of time that in many cases it is doubtful wherether it will ever be necessary to refill the reservoir with lubricant. The life of the bearing and the supply of lubricant will undoubtedly in many cases be found to be as long or longer than the useful life of the automotive vehicle in which such bearings are used, thereby eliminating any necessity for refilling.

Fig. 2 may thus be considered as exemplary of half of a bearing which is not provided with any special apertures for communication with a reservoir, the other half of the same bearing being identical in construction.

The collar 12 comprises a substantially annular member provided with the enlarged aperture 29 for passing a drive shaft and with the flat end surfaces 30, 31, the latter of which acts as a thrust bearing surface when the device is used as a clutch throw-out collar. The member 12 is also provided with the outer cylindrical surfaces 32, 33, the cylindrical surface 33 being of such size that it fits closely in the counterbore 16 and is, in fact, slightly larger so that it may be secured therein by a pressed fit, the collar being driven home against the collar surface 18. The length of the cylindrical part 33 is greater than the depth of the counterbore 16, thereby leaving the open space 34 which forms a reservoir for lubricant between the annular surface 19 on the metallic body and the annular surface 35 on the collar.

The size of the cylindrical portion 32 is such that it forms a close frictional lubricant-tight fit with the counter-bore 17 and so that the collar 12 may be secured in place by the frictional engagement of its cylindrical surface 32 with the wall of the counterbore 17.

I am aware that carbon members have been secured in clutch collars by means of the expansion of the metallic part and the subsequent cooling and shrinkage of the metallic part on the carbon member, but such methods of operation sometimes result in breakage of the carbon member, which is incapable of resisting a great amount of pressure such as might be brought to bear upon it by contraction of the metallic body on the carbon part. Therefore, I prefer to assemble these parts by a pressed fit, which, however, should be sufficiently close to effect a lubricant-tight juncture between the carbon and the respective counterbores 16, 17 and the annular surface 18.

These surfaces may be and preferably are machined to a relatively smooth and true shape before assembly with the collar.

In the devices of the prior art a reservoir has been filled with lubricant by forcing it in at one aperture and permitting the air to be expelled from another aperture. It is, however, extremely difficult to fill all parts of the bearing with lubricant according to this practice unless the lubricant is relatively liquid, and the preferred form of lubricant which is used in bearings of this type is semi-solid, such as petrolatum.

I prefer to fill the reservoir 34 with semi-solid lubricant by immersing both the carbon member and the metal body in petrolatum, which may be heated to a liquid state, and pressing these two members together while immersed in the liquid lubricant. Thus the reservoir 34 may be entirely filled without any possibility of the presence of air bubbles or air in the pockets which might be formed between an inlet and outlet conduit.

In a further improvement in the method of assembly, the carbon member is rotated with respect to the metal body as these parts are pressed together, thereby bringing these parts into closer fitting relation due to the working in of the two parts during rotation.

Referring to Figs. 3 and 4, this is another modification, in which a journal bearing is constructed in a manner similar to Figs. 1 and 2. In this case the bearing consists of an outer shell 36, which is provided with an inwardly extending flange 37 surrounding a bore 38. The shell 36 is provided with a counter-bore 39 and the bearing includes a second sleeve 40 having an outer cylindrical surface 41 which is a pressed fit in the counterbore 39.

The inner sleeve 40 is provided with a reduced cylindrical portion 42 and an annular shoulder 43, while the inwardly extending flange 37 has an annular surface 44. The length of the cylindrical surface 42 is greater than the length of the bore 38 in flange 37, thereby leaving a space 45 which is bounded by surfaces 39, 42, 43, 44 and forms a reservoir. The inner shell may be provided with a plurality of apertures 46 extending through it and communicating with the reservoir 45, and with a plurality of longitudinally extending slots 47 which communicate with the apertures 46.

The slots 47 and apertures 46 may be filled with initially plastic graphite or carbon compound which may be baked in place to render it porous and which constitutes a lubricant conducting member. This reservoir may also be filled by immersion of the two sleeves 36 and 40 while they are being pressed together, and therefore it is unnecessary to have any filling openings, and the bearing may be refilled by separation of the parts and re-assembly while immersed in the lubricant mentioned above.

Both the lubricating members 48 and the carbon member 12 may be manufactured of initially plastic carbon or graphite compound, including carbon, graphite and a binder, which are shaped in the plastic state and baked to render them porous, and which may be purchased on the open market either in the form of the compound or in the form of the baked porous article. Therefore, it is unnecessary to go into further detail as to the compound employed.

Referring to Fig. 5, this is a modification in which the carbon member 12 may be provided with a reduced cylindrical surface 49 extending into the counterbore 17, thereby leaving a relatively small groove 50 between the carbon member 12 and body 11. This groove may be filled with cement, if desired, to assist in the securement of the carbon ring in the metallic body without necessity for any heating or shrinking operations.

Referring to Fig. 6, this is another modification in which the groove 50, identical in shape to that of Fig. 5, has been initially filled, and the collar permanently secured in the metallic body by spinning or riveting over a portion or portions of the metallic body at 51, extending over the annular shoulder 52 on the carbon member.

The carbon member may be secured by merely peening or riveting over a few spaced portions of the metal, or the member 51 may be in the form of a continuous flange formed by a spinning operation, thereby permanently securing these parts together.

Fig. 6 includes a further improvement in the form of a conduit 53, which may be cored or bored in either or both of the trunnions 13, 14 to provide communication with the reservoir 34. This conduit 53 communicates with the transverse cored or bored conduits 54, and both the conduits 53, 54 may be filled with initially plastic graphite or carbon compound which is baked in place to render it porous. The same reservoir in this case supplies lubricant to the trunnions 13, 14 and renders them self-lubricating.

Referring to Fig. 7, this is another modification in which the part 55 of the carbon member 12 has been slightly tapered, the taper corresponding to that employed in the round aperture 56 in the metal body 11. The difficulty of providing two annular surfaces on two bodies, both of which must register with each other and have a close frictional fit, may in some embodiments of the invention render tapered surfaces 55, 56 desirable.

Referring to Fig. 1, the porous carbon collar may also be provided with a groove 57 extending from the front to the back across the cylindrical portion 32 on the periphery of the carbon member for the purpose of providing a vent located at the upper side of the collar for refilling purposes. This groove 57 provides an opening at the top of the reservoir through which the air may escape when additional lubricant is inserted through the filling opening 23. It should be understood that any or all of the embodiments described herein may be provided with such a vent.

It will thus be observed that the machine work in the present devices has been reduced to a minimum and the operation of assembly may be accomplished more quickly and with less possibility of breakage than with the devices of the prior art. Since the lubricant filling operation is carried on at the same time the parts are assembled, this also reduces the number of steps in manufacture of the device and reduces its cost, and the present device may be constructed very economically.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim is new and desire to secure by Letters Patent of the United States, is:

In a self-lubricating bearing, the combination of a metallic member formed with a pair of circular bores of different sizes and having an annular shoulder between said bores, a porous carbon lubricating collar having a thrust bearing surface and provided with two cylindrical surfaces, each adapted to a close frictional fit with one of said bores, said porous carbon member being formed with an annular surface between said cylindrical surfaces, and said metallic member and carbon member being assembled in such manner as to maintain said annular surfaces in spaced relation to each other, forming a reservoir, said metallic member having an inwardly extending flange engaging the end of said porous carbon member, said metallic member having an outwardly projecting trunnion provided with conduits leading from said reservoir to the bearing surface of said trunnion, and a porous carbon filling in said conduits for conducting lubricant from said reservoir to the bearing surface of said trunnion.

ROBERT H. WHITELEY.